United States Patent [19]

Valentine

[11] Patent Number: 5,535,708
[45] Date of Patent: Jul. 16, 1996

[54] REDUCTION OF NITROGEN OXIDES EMISSIONS FROM DIESEL ENGINES

[75] Inventor: James M. Valentine, Fairfield, Conn.

[73] Assignee: Platinum Plus, Inc., Stamford, Conn.

[21] Appl. No.: 331,473

[22] PCT Filed: Aug. 29, 1994

[86] PCT No.: PCT/US94/09628

§ 371 Date: Oct. 31, 1994

§ 102(e) Date: Oct. 31, 1994

[87] PCT Pub. No.: WO90/07561

PCT Pub. Date: Jul. 12, 1990

[51] Int. Cl.$^6$ .................................................. F02B 47/02
[52] U.S. Cl. .......................... 123/25 C; 123/1 A; 44/301
[58] Field of Search .................................. 123/1 A, 25 C, 123/25 E; 44/51, 301, 302

[56] References Cited

U.S. PATENT DOCUMENTS

| | | | |
|---|---|---|---|
| 2,086,775 | 7/1937 | Lyons et al. | 44/9 |
| 2,151,432 | 3/1939 | Lyons et al. | 44/9 |
| 3,615,290 | 10/1971 | Nixon | 44/51 |
| 3,876,391 | 4/1975 | McCoy et al. | 44/51 |
| 3,900,554 | 8/1975 | Lyon | 423/235 |
| 3,961,609 | 6/1976 | Gerry | 123/1 A |
| 4,208,386 | 6/1980 | Arand et al. | 423/235 |
| 4,325,924 | 4/1982 | Arand et al. | 423/235 |
| 4,401,439 | 8/1983 | Graiff et al. | 123/1 A |
| 4,629,472 | 12/1986 | Haney, III et al. | 44/51 |
| 4,696,638 | 9/1987 | Denherder | 431/4 |
| 4,795,478 | 1/1989 | Layvisse et al. | 44/51 |
| 4,892,562 | 1/1990 | Bowers et al. | 44/67 |
| 4,928,635 | 5/1990 | Shelor | 123/2 |
| 5,104,418 | 4/1992 | Genova et al. | 44/302 |

FOREIGN PATENT DOCUMENTS

| | | |
|---|---|---|
| 1318716 | 12/1989 | Japan. |
| 8603492 | 6/1986 | WIPO. |
| 9007561 | 7/1990 | WIPO. |

OTHER PUBLICATIONS

"Diesel Engine NOx control: Selective Catalytic Reduction and Methanol Emulsion", John H. Wasser and Richard B. Perry, EPRI/EPA Jt. Symposium on Stationary NOx Control, New Orleans LA—Mar. 1987.

"Assessment Of Diesel Particulate Control—Direct and Catalytic Oxidation", M. J. Murphy, L. J. Hillenbrand, and D. A. Trayser, SAE Paper No. 810112—1981.

"Effects Of Platinum Fuel Additive On The Emissions and Efficiency of Diesel Engines", SAE Paper No. 901,492—Aug. 1990.

Primary Examiner—Erick R. Solis
Attorney, Agent, or Firm—St. Onge Steward Johnston & Reens

[57] ABSTRACT

The present invention relates to a process for reducing nitrogen oxides emissions from a diesel engine, which comprises preparing an emulsion of an aqueous urea solution in diesel fuel, and supplying said emulsion to a diesel engine for combusting therein, whereby combustion of the emulsion leads to a reduction in the nitrogen oxides emissions from the diesel engine when compared with combustion of diesel fuel alone.

13 Claims, 1 Drawing Sheet

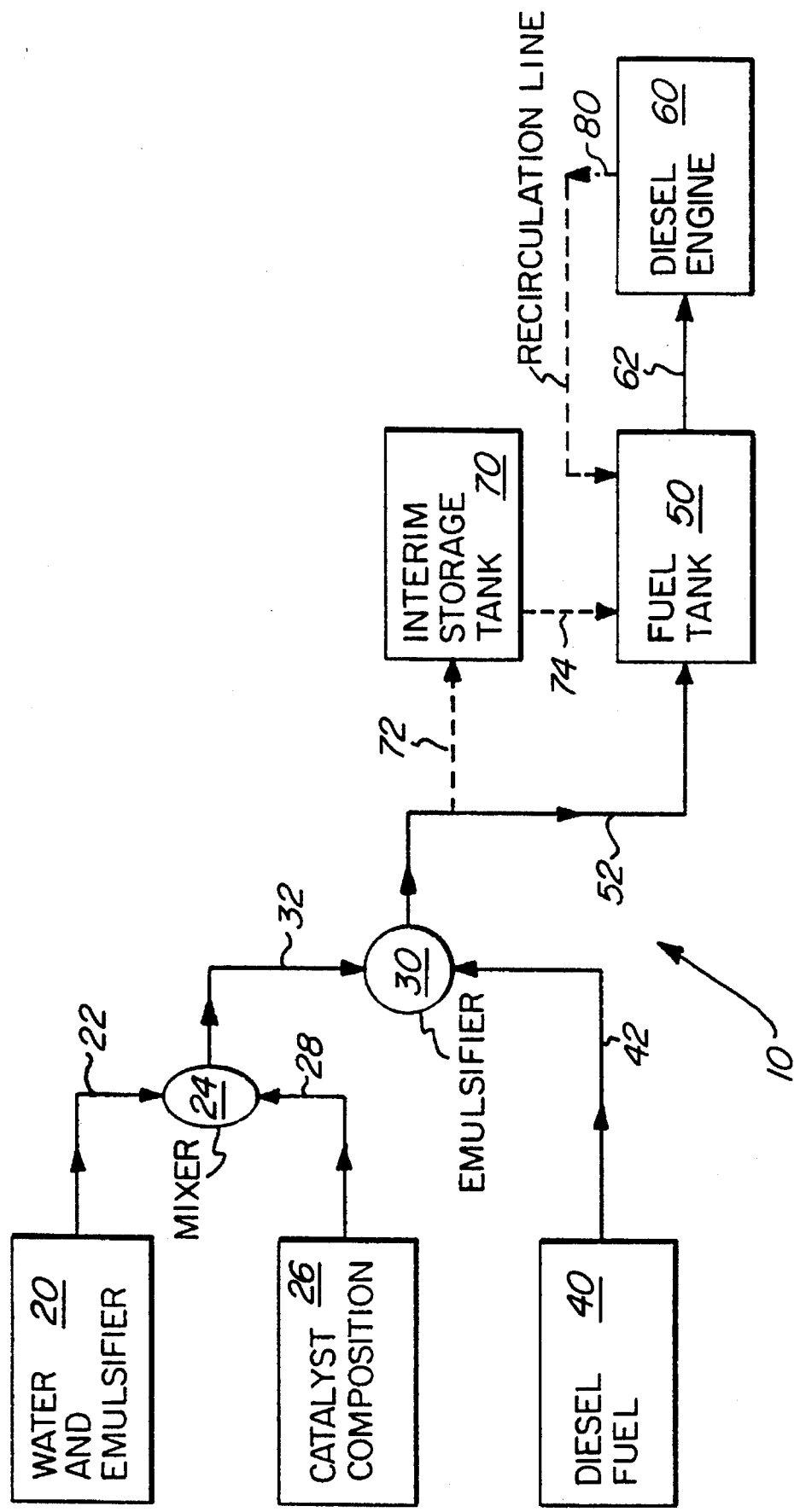

REDUCTION OF NITROGEN OXIDES EMISSIONS FROM DIESEL ENGINES

TECHNICAL FIELD

The present invention relates to a process useful for reducing the nitrogen oxides ($NO_x$, where x is an integer, generally 1 or 2) emissions from a diesel engine to achieve reductions in nitrogen oxides in an efficient, economical, and safe manner not before seen.

One significant drawback to the use of diesel-fueled trucks, buses, passenger vehicles, locomotives, off-road vehicles, etc. (as opposed to gasoline-powered vehicles) is caused by their relatively high flame temperatures during combustion, which can be as high as 2200° F. and higher. Under such conditions there is a tendency for the production of thermal $NO_x$ in the engine, the temperatures being so high that free radicals of oxygen and nitrogen are formed and chemically combine as nitrogen oxides. In fact, $NO_x$ can also be formed as a result of the oxidation of nitrogenated species in the fuel.

Nitrogen oxides comprise a major irritant in smog and are believed to contribute to tropospheric ozone, which is a known threat to health. In addition, nitrogen oxides can undergo photochemical smog formation through a series of reactions in the presence of sublight and hydrocarbons. Furthermore, they have been implicated as a significant contributor to acid rain and are believed to augment the undesirable warming of the atmosphere which is generally referred to as the "greenhouse effect."

Methods for the reduction of $NO_x$ emissions from diesel engines which have previously been suggested include the use of catalytic converters, engine timing changes, exhaust gas recirculation, and the combustion of "clean" fuels, such as methanol and natural gas. Unfortunately, the first three would be difficult to implement because of the effort required to retrofit existing engines. In addition, they may cause increases in unburned hydrocarbons and particulate emissions to the atmosphere. Although the use of clean fuels do not have such drawbacks, they require major changes in a vehicle's fuel system, as well as major infrastructure changes for the production, distribution, and storage of such fuels.

What is desired, therefore, is a method and composition which can achieve significant reductions in the $NO_x$ emissions from diesel engines without requiring substantial retrofitting of the engines, nor an increase in emissions of other pollutants. The method and composition selected should be capable of being instituted on a commercial level without significant infrastructure changes.

BACKGROUND ART

The desirability of improving the efficiency of combustion in a vehicle's engine has long been recognized. For instance, Lyons and McKone is U.S. Pat. No. 2,086,775, and again in U.S. Pat. No. 2,151,432, disclose a method for improving combustion efficiency in an internal combustion engine by adding to the fuel what is described as "relatively minute quantities" of catalytic organometallic compounds. The Lyons and McKone patents, though, are directed solely to internal combustion engines and do not address the problem of $NO_x$ emissions from diesel engines.

In a unique application of catalytic technology described in International Publication No. WO 86/03482 and U.S. Pat. No. 4,892,562, Bowers and Sprague teach the preparation of diesel fuel containing fuel soluble platinum group metal compounds at levels of from 0.01 to 1.0 parts per million (ppm). The Bowers and Sprague results were corroborated and refined by work of Kelso, Epperly, and Hart, described in "Effects of Platinum Fuel Additive on the Emissions and Efficiency of Diesel Engines," Society of Automotive Engineers (SAE) Paper No. 901,492, August 1990. Although the use of platinum group metal additives is effective, further nitrogen oxides reductions are still believed possible.

Moreover, in "Assessment of Diesel Particulate Control—Direct and Catalytic Oxidation," SAE Paper No. 81 0112, 1981, Murphy, Hillenbrand, Trayser, and Wasser have reported that the addition of catalyst metal to diesel fuel can improve the operation of a diesel trap. Among the catalysts disclosed is a platinum compound, albeit one containing chlorine, known to reduce catalyst effectiveness. In addition, the regeneration of a diesel trap by the use of a metallic additive which can include copper, nickel, cobalt, and, especially, iron, is discussed by Müeller, Wiedemann, Preuss and Schädlich in "Diesel Particulate Filter System With Additive Supported Regeneration," ATZ Automobiltechnische Zeitschrift 91 (1989).

Other researchers have considered the use of water in oil emulsions for improving combustion efficiency in diesel engines. For instance, DenHerder, in U.S. Pat. No. 4,696,638, discusses such emulsions and indicates that the positive effects therefrom include "cleaner exhaust." Although the disclosure of Denherder refers to emulsions containing up to about 40% water, Denherder is primarily directed to emulsions having only up to about 10% water in the form of droplets having a diameter of about 1 to about 10 microns.

Furthermore, Wasser and Parry have reported in "Diesel Engine $NO_x$ Control: Selective Catalytic Reduction and Methanol Emission," EPRI/EPA Joint Symposium on Stationary $NO_x$ Control, New Orleans, La., March, 1987 that $NO_x$ reductions of up to 80%, which are the levels desired for effective emission control, can be achieved in diesel engines using water and oil emulsions. They found, though, that emulsions of at least 60% water in oil are necessary to achieve such reductions. Unfortunately, such high water ratios can lead to increased emissions of carbon monoxide (CO) and unburned hydrocarbons. In addition, such high water levels can also cause problems in emulsion stability and create corrosion and storage volume concerns.

Recently, Dainoff and Sprague, in U.S. patent application entitled "Process for Reducing Nitrogen Oxides Emissions and Improving the Combustion Efficiency of a Turbine:, Ser. No. 07/691,556, filed Apr. 25, 1991, have discovered that water-in-fuel oil emulsions up to about 50% water by weight are useful for reducing nitrogen oxides and particulate emissions from combustion turbines, but they do not address the usefulness of such emulsions in vehicle diesel engines.

There has been a great deal of study of processes and agents for reducing nitrogen oxides emissions from stationery sources, such as boilers, etc. Preferred among such processes are those referred to as selective, non-catalytic reduction (SNCR) $NO_x$ reducing processes. Such processes involve the introduction of a $NO_x$ reducing treatment agent into a combustion effluent to achieve reductions of nitrogen oxides of up to about 50% or greater by a gas phase free radical mediated reaction process. SNCR processes generally utilize a nitrogen containing treatment agent such as ammonia, urea, or other chemicals and compositions which can break down in the effluent to the amidozine radical, which is believed to be the moiety which reacts with and reduces nitrogen oxides to molecular nitrogen ($N_2$).

Such processes are disclosed by, for instance, Lyon, in U.S. Pat. No. 3,900,554, Arand, Muzio, and Sotter, in U.S. Pat. No. 4,208,386, and Arand, Muzio, and Teixeira, in U.S. Pat. No. 4,325,924. Although effective at reducing nitrogen oxides in effluents from open flame combustion, it has been believed that at the temperatures and pressures which exist in diesel engines, the use of nitrogenous nitrogen oxides reducing agents in such processes may actually create $NO_x$, thus exacerbating the problem.

Accordingly, a process and composition which is effective at substantially reducing the nitrogen oxides emissions from a diesel engine without the drawbacks of the prior art is extremely desirable.

DISCLOSURE OF INVENTION

The present invention relates to a process for reducing $NO_x$ emissions from diesel engines which involves forming an emulsion of an aqueous urea solution in diesel fuel at a solution to fuel ratio of up to about 70% by weight and combusting the emulsion in a diesel engine.

BRIEF DESCRIPTION OF THE DRAWING

The present invention will be understood and its advantages more apparent in view of the following detailed description, especially when read with reference to the appended drawing which comprises a schematic illustration of a diesel engine fuel system according to the present invention.

DETAILED DESCRIPTION OF THE PREFERRED EMBODIMENT

As noted, this invention relates to a process which involves forming an emulsion of an aqueous urea solution in diesel fuel. The emulsion is used to fuel a diesel engine in order to reduce nitrogen oxides emissions from the engine. In more advantageous embodiments of the present invention, the emulsion also comprises a water soluble platinum group metal composition.

The oil phase in the inventive emulsion comprises what is conventionally known as diesel fuel, as defined by the American Society of Testing and Management (ASTM) Standard specification for Fuel Oils (designation: D 396-86). The water which is used to form the emulsion is preferably demineralized water. Although demineralized water is not required for the successful control of nitrogen oxides, it is preferred in order to avoid the deposit of minerals from the water on the internal surfaces of the diesel engine fuel system through which the inventive emulsion flows. In this way, engine life is extended and maintenance and repair time significantly reduced.

The emulsion preferably comprises about 5% to about 70% of an aqueous urea solution in fuel. More preferably, the emulsion comprises about 15% to about 45% of the solution in diesel fuel. The emulsion is preferably prepared by passing the urea solution and the diesel fuel through a mechanical emulsifying device which can be provided on site or within the fuel system of the diesel vehicle. After being emulsified, the subject emulsion can be stored in an appropriate storage unit or tank prior to combustion or supplied directly to a diesel engine as output from the emulsifier.

Advantageously, the emulsions are prepared such that the discontinuous phase (i.e., the urea solution) has a particle size wherein at least about 70% of the droplets are below about 5 microns Sauter mean diameter.

Emulsion stability is largely related to droplet size. The primary driving force for emulsion separation is the large energy associated with placing oil molecules in close proximity to water molecules in the form of small droplets. Emulsion breakdown is controlled by how quickly droplets coalesce. Emulsion stability can be enhanced by the use of surfactants and the like, which act as emulsifiers or emulsion stabilizers. These generally work by forming repulsive layers between droplets prohibiting coalescence. The gravitational driving force for phase separation is much more prominent for large droplets, so emulsions containing large droplets separate most rapidly.

Smaller droplets also settle, but can be less prone to coalescence, which is the cause of creaming. If droplets are sufficiently small, the force of gravity acting on the droplet is small compared to thermal fluctuations or subtle mechanical agitation forces. In this case the emulsion can become stable almost indefinitely, although given a long enough period of time or a combination of thermal fluctuations these emulsions will eventually separate.

As noted above, the emulsion to be used as the fuel for a diesel engine comprises diesel fuel into which is emulsified an aqueous solution of urea. Although urea is most preferred for the solution, compounds useful in this invention include urea as well as other compounds equivalent in effect. Among such other compounds are one or more of the hydrolysis products of urea (including ammonium carbamate, ammonium carbonate and ammonium bicarbonate), ammonium formate, ammonium oxalate, ammonium hydroxide, bipyridyl, cyanuric acid, urea-formaldehyde reaction product and various stable amines including hexamethylenetetramine and mixtures of these. Thus, unless otherwise specified, reference in this disclosure to urea should not be taken as limiting to urea itself but should also extend to urea and all of its equivalents. It is pointed out that the term "equivalent" is not limited to exact equivalents, and various materials within the listing of equivalents will be optimally operable at some conditions which are different than those for other of the listed materials. Moreover, some of the materials may be more effective than others.

The concentration of urea in the aqueous solution should be that sufficient to provide a final emulsion effective for the reduction of nitrogen oxides when used as the fuel for a diesel engine. Typically, the urea concentration in the emulsion is at least about 0.5%. Preferably, the final urea concentration in the emulsion is about 5% to about 25%. Advantageously, the urea concentration in the aqueous solution used to form the emulsion is about 5% to about 35%, more preferably about 10% to about 25%.

In a preferred embodiment, the urea solution is prepared in more concentrated form than that desired for the emulsion. This concentrated urea solution can then be diluted "on site" or within the diesel engine fuel system by adding more water. In this way, the costs of transportation and storage of the desired urea solution can be avoided because the transportation of a more concentrated solution is more economical since dilution water is likely to be available on site. A typical urea "concentrate" solution comprises at least about 15% urea by weight. More particularly, a concentrated solution (e.g., about 30% to about 50%) of urea and water can be prepared and provided to the vehicle fuel system, where it can be combined with dilution water via an in-line mixer or pump to provide an aqueous urea solution at the desired concentration.

In another embodiment of this invention, the emulsion comprises a combustion catalyst such as compositions or complexes of cerium, platinum or a platinum group metal, copper, iron, or manganese. Such catalysts, especially when the composition comprises platinum or a platinum group metal, can be included in the emulsion at levels which can range from about 0.005 to about 1.0 parts per million (ppm), especially about 0.01 to about 0.5 ppm Most preferably the combustion catalyst is included within the aqueous phase of this system. Suitable catalysts which are water soluble or water dispersible are disclosed by Haney and Sullivan in U.S. Pat. No. 4,629,472, the disclosure of which is incorporated herein by reference.

In the alternative, a catalyst can be included within the fuel phase of the system, or added to the emulsion after it is formed. In this case, the catalyst composition should be fuel soluble, such as those disclosed by Bowers and Sprague in U.S. Pat. No. 4,892,562 and Epperly, Sprague, Kelso, and Bowers in International Publication No. WO 90/07561, the disclosures of each of which are incorporated herein by reference. Of course, where the catalyst is added to the fuel phase prior to emulsification, the partition ratio, that is, the ratio of solubility in the fuel as compared with the aqueous phase, of the catalyst composition should be as described in International Publication No. WO 90/07561.

The conditions under which the diesel engine is operating and the level of nitrogen oxides reduction desired will determine how this invention is applied. Under certain conditions, the use of an emulsion alone will suffice, whereas other conditions merit the application of a catalyst composition to the emulsion.

Because the inventive emulsion may have to sit stagnant in storage, for instance, when used as a fuel source for highway vehicles where it is pumped into a holding tank from which limited amounts are pumped out for the vehicles, it may be necessary to include a component effective for maintaining the stability of the emulsion such as a surfactant. In fact, sufficient stabilizing component may be needed to provide stability for up to about six months in the case of use for highway vehicles. Even where shorter fuel residence times are encountered, such as by captive fueled city buses or delivery vehicles, emulsion stability for one week or greater may still be necessary.

In order to avoid separation of the emulsion into its components, which can cause slugs of water to be injected through the injector nozzle leading to combustion problems and possible engine damage, an emulsifier or emulsion stabilizer should also be included in the emulsion. Suitable emulsifiers or emulsion stabilizers are known to the skilled artisan and include alkanolamides and phenolic surfactants such as ethoxylated alkylphenols, as well as various other phenolic and other artknown surfactants. Advantageously, the emulsifier is present in the emulsion at a level of about 0.01% to about 3.0% by weight. When used, the emulsifer is preferably provided in the aqueous phase.

The appended drawing figure illustrates a diesel engine vehicle fuel system 10 which makes use of a preferred embodiment of the present invention. As illustrated therein, an aqueous solution of urea is provided from a suitable source tank 20 through line 22 to an inline mixer 24 via a suitable pump (not shown). When the aqueous phase comprises a concentrated urea solution, water (and emulsifier) is supplied from tank 26 through line or conduit 28 by the action of a suitable pump (not shown) to in-line mixer 24, which functions to dilute the urea solution to the desired level. The diluted urea solution is then directed via pump (not shown) through line 32 to a mechanical emulsifier 30. Diesel fuel from a suitable source tank 40 is concurrently directed by the action of a pump (not shown) to emulsifier 30 through line 42 where the diesel fuel and water or urea solution are emulsified together in the appropriate ratios.

After existing from emulsifier 30 the diesel fuel emulsion is directed via line 52 to fuel tank 50 via a suitable pump (not shown) from where it is fed by a pump (not shown) via line 62 to diesel engine 60. In the alternative, the emulsion exiting from mechanical emulsifier 30 can be supplied via lines 52 and 72 to interim storage tank 70 where it is stored prior to combustion. The emulsion is then directed from storage tank 70 through line 74 to fuel tank 50 and then to engine 60.

In addition, in order to maintain emulsion stability, the emulsion from diesel engine 60 can be recirculated via recirculation line 80 to fuel tank 50 and then back to diesel engine 60 via line 56. Thus, by use of the illustrated system, a diesel vehicle can be modified to prepare and combust an emulsion comprising an aqueous urea solution in diesel fuel.

Although the precise reason for the degree of nitrogen oxides reductions achievable with the present invention is not fully understood, it is believed that the water component of the subject emulsion serves to reduce the peak flame temperatures of combustion which limits overall $NO_x$ formation and as a carrier for urea and/or the catalyst, when used. The reduced peak flame temperature provides a favorable temperature window for urea mediated $NO_x$ reduction. Because of the high pressures encountered in diesel engines, and the quenched peak flame temperatures resulting from the use of the water phase of the emulsion, urea in the emulsion will chemically convert $NO_x$ to elemental nitrogen ($N_2$), water vapor, and carbon dioxide ($CO_2$). When a catalyst composition is used, an increase in combustion efficiency is obtained (as well as an increase in horsepower and fuel economy, it is believed).

Accordingly, use of the inventive emulsion in the illustrated diesel engine fuel system leads to reduction of nitrogen oxides under conditions and to levels not before thought possible.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

What is claimed is:

1. A process for reducing nitrogen oxides emissions from a diesel engine comprising forming an emulsion of an aqueous solution in diesel fuel which comprises (a) about 5% to about 70% solution by weight of a compound selected from the group consisting of urea, ammonium carbamate, ammonium carbonate, ammonium bicarbonate, ammonium formate, ammonium oxalate, ammonium hydroxide, bipyridyl, cyanuric acid, urea-formaldehyde reaction product, and stable amines including hexamethylenetetramine, and mixtures of these, and (b) a catalyst comprising a composition or complex of a metal selected from the group consisting of cerium, platinum or a platinum group metal, copper, iron or manganese, wherein at least about 70% of the water droplets in the emulsion have a particle size below about 5 microns Sauter mean diameter, and supplying said emulsion to a diesel engine to be combusted therein, whereby combustion of the emulsion leads to a reduction in the nitrogen oxides emissions from the diesel engine when compared with combustion of diesel fuel alone.

2. The process of claim 1, wherein said aqueous urea solution comprises about 5% to about 35% urea by weight.

3. The process of claim 1, wherein at least about 85% of the water droplets have a particle size below about 5 microns Sauter mean diameter.

4. The process of claim 1, wherein said catalyst comprises a water soluble or water dispersible platinum group metal composition present in the aqueous phase of said emulsion.

5. The process of claim 1, wherein said catalyst comprises a fuel soluble platinum group metal composition present in the fuel phase of said emulsion or in said emulsion after it is formed.

6. A process for reducing nitrogen oxides emissions from a diesel engine comprising:
   a. preparing a solution of a compound selected from the group consisting of urea, ammonium carbamate, ammonium carbonate, ammonium bicarbonate, ammonium formate, ammonium oxalate, ammonium hydroxide, bipyridyl, cyanuric acid, urea-formaldehyde reaction product, and stable amines including hexamethylenetetramine, and mixtures of these in water to form an aqueous solution;
   b. emulsifying said aqueous solution with diesel fuel to form an emulsion; and
   c. incorporating into the emulsion a catalyst comprising a composition or complex of a metal selected from the group consisting of cerium, platinum or a platinum group metal, copper, iron or manganese;
   d. supplying said emulsion to a diesel engine to be combusted therein, whereby combustion of the emulsion leads to a reduction in the nitrogen oxides emissions from the diesel engine when compared with combustion of diesel fuel alone.

7. The process of claim 6, wherein said urea solution further comprises an emulsifier.

8. The process of claim 7, wherein said emulsifier is selected from the group consisting of alkanolamides and phenolic surfactants.

9. The process of claim 6, wherein said aqueous solution comprises about 5% to about 35% urea by weight.

10. The process of claim 6, wherein said emulsion comprises about 15% to about 45% aqueous solution by weight.

11. The process of claim 6, wherein said aqueous solution is prepared by first forming a concentrated solution of urea comprising about 30% to about 50% urea by weight and then diluting said concentrated solution with water until the concentration of urea is about 5% to about 25% by weight.

12. The process of claim 6, wherein said catalyst comprises a water soluble or water dispersible platinum group metal composition present in the aqueous phase of said emulsion.

13. The process of claim 6, wherein said catalyst comprises a fuel soluble platinum group metal composition present in the fuel phase or in said emulsion after it is formed.

* * * * *

UNITED STATES PATENT AND TRADEMARK OFFICE
CERTIFICATE OF CORRECTION

PATENT NO. : 5,535,708
DATED : July 16, 1996
INVENTOR(S) : James M. Valentine

It is certified that error appears in the above-indentified patent and that said Letters Patent is hereby corrected as shown below:

Column 1, line 27, "sublight" should read --sunlight--.

Signed and Sealed this

Seventh Day of January, 1997

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,535,708

DATED : July 16, 1996

INVENTOR(S) : James M. Valentine

It is certified that error appears in the above-indentified patent and that said Letters Patent is hereby corrected as shown below:

At Column 2, lines 28 and 29, "Denherder" should be replaced with --DenHerder--.

At Column 2, line 47, delete " : " immediately after "Turbine" and replace it with -- " --.

At Column 5, line 10, insert -- . -- immediately after "0.5 ppm".

At Column 6, line 8, "existing" should be replaced with --exiting--.

Signed and Sealed this

Twenty-fifth Day of February, 1997

Attest:

Attesting Officer

BRUCE LEHMAN

Commissioner of Patents and Trademarks